(12) United States Patent
Tamura

(10) Patent No.: US 8,553,257 B2
(45) Date of Patent: Oct. 8, 2013

(54) COMMUNICATION DEVICE DRIVEN BY AN ON-DEMAND DRIVER INSTALLED IN AN APPARATUS, METHOD OF CONTROLLING THE SAME, AND SYSTEM INCLUDING THE SAME

(75) Inventor: Hiroshi Tamura, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 311 days.

(21) Appl. No.: 12/706,428

(22) Filed: Feb. 16, 2010

(65) Prior Publication Data

US 2010/0214603 A1     Aug. 26, 2010

(30) Foreign Application Priority Data

Feb. 25, 2009 (JP) ................................. 2009-042932

(51) Int. Cl.
*G06F 15/00* (2006.01)
(52) U.S. Cl.
USPC ......................................... 358/1.15; 710/315
(58) Field of Classification Search
USPC ........................................ 358/1.15; 710/315
See application file for complete search history.

(56) References Cited

U.S. PATENT DOCUMENTS

| | | | | |
|---|---|---|---|---|
| 2003/0184784 A1* | 10/2003 | Ferlitsch | ...................... | 358/1.13 |
| 2004/0201867 A1* | 10/2004 | Katano | ......................... | 358/1.15 |
| 2005/0246478 A1* | 11/2005 | Tanaka | .......................... | 710/315 |
| 2007/0019236 A1* | 1/2007 | Sando | .......................... | 358/1.15 |
| 2009/0063710 A1 | 3/2009 | Sekine et al. | | |
| 2009/0063718 A1 | 3/2009 | Sekine et al. | | |

FOREIGN PATENT DOCUMENTS

| | | |
|---|---|---|
| JP | 2005-267367 | 9/2005 |
| JP | 2008-9494 | 1/2008 |
| JP | 2008-165654 | 7/2008 |

OTHER PUBLICATIONS

Office Action issued Jan. 8, 2013 in Japanese Patent Application No. 2009-042932.

* cited by examiner

*Primary Examiner* — Qian Yang
(74) *Attorney, Agent, or Firm* — Oblon, Spivak, McClelland, Maier & Neustadt, L.L.P.

(57) ABSTRACT

A communication device is driven by an on-demand driver installed in an apparatus that includes an on-demand driver generating program that generates the on-demand driver for the communication device based on device information of the communication device. The communication device includes a memory unit that stores therein the device information of the communication device, a responding unit that, in response to a request for obtaining the device information from the on-demand driver generating program, sends the device information stored in the memory unit to the apparatus, and an updating unit that is used in externally updating the device information stored in the memory unit.

15 Claims, 13 Drawing Sheets

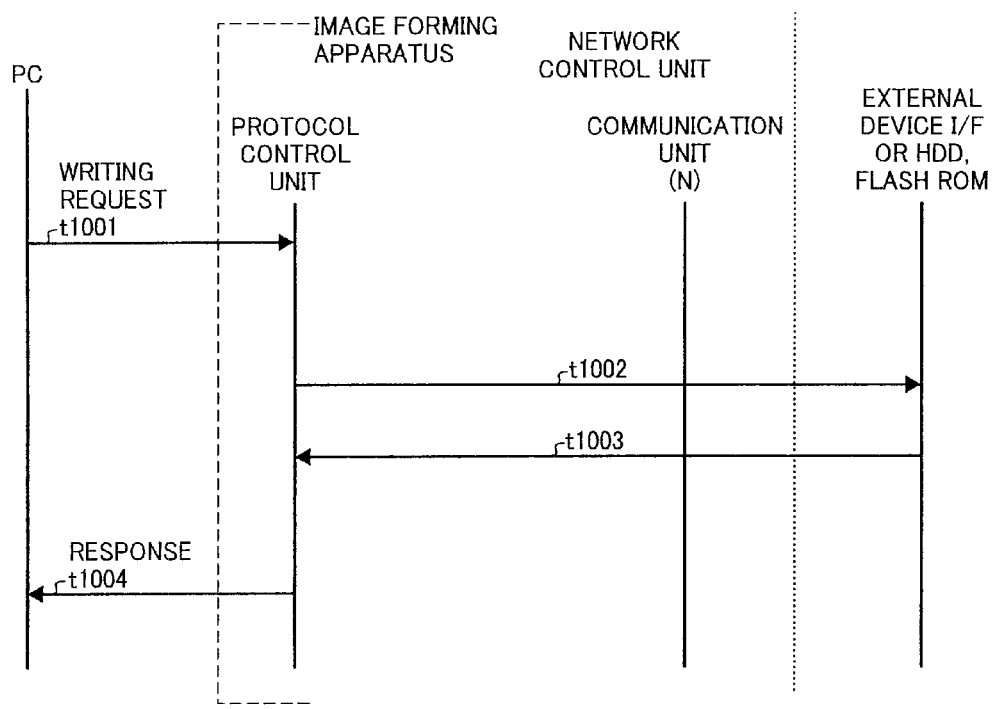
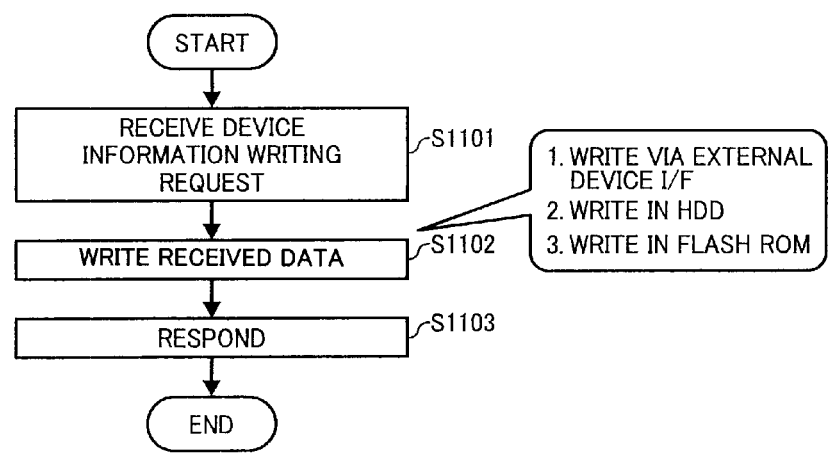

FIG. 12

```
<?xml version="1.0" encoding="utf-8"?>
<soap:Envelope xmlns:soap="http://www.w3.org/2003/05/soap-envelope"
xmlns:wsa="http://schemas.xmlsoap.org/ws/2004/08/addressing"
xmlns:rpd="http://schemas.ricoh-abc.com/print">
<soap:Header>

ABBREVIATION

</soap:Header>

<soap:Body>

FIXED PORTION
<rpd:Existing Information>
<rpd:Resolution>
 <rpd:AllowedValue>300</rpd:AllowedValue>
 <rpd:AllowedValue>600</rpd:AllowedValue>
</rpd:Resolution>

<rpd:PaperFeedUnit>
 <rpd:AllowedValue>Type-PF-A</rpd:AllowedValue>
</rpd:PaperFeedUnit>

<rpd:FinisherUnit>
 <rpd:AllowedValue>Type-FIN-B</rpd:AllowedValue>
</rpd:FinisherUnit>

SNIP

</rpd:Existing Information>

</soap:Body>
</soap:Envelope>
```

FIG. 13

```
<?xml version="1.0" encoding="utf-8"?>
<soap:Envelope xmlns:soap="http://www.w3.org/2003/05/soap-envelope"
xmlns:wsa="http://schemas.xmlsoap.org/ws/2004/08/addressing"
xmlns:rpd="http://schemas.ricoh-abc.com/print">
<soap:Header>

ABBREVIATION

</soap:Header>

<soap:Body>

REWRITABLE PORTION AND DESCRIPTION PORTION OF
MAXIMUM OPTIONAL CONFIGURATION
<rpd:InstallableOption Feature="PaperFeedUnit">
  <rpd:AllowedValue>Type-PF-A</rpd:AllowedValue>
  <rpd:AllowedValue>Type-PF-B</rpd:AllowedValue>
  <rpd:AllowedValue>Type-PF-C</rpd:AllowedValue>
</rpd:InstallableOption>

<rpd:InstallableOption Feature="FinisherUnit">
  <rpd:AllowedValue>Type-FIN-A</rpd:AllowedValue>
  <rpd:AllowedValue>Type-FIN-B</rpd:AllowedValue>
  <rpd:AllowedValue>Type-FIN-C</rpd:AllowedValue>
</rpd:InstallableOption>

SNIP

</soap:Body>
</soap:Envelope>
```

FIG. 14

```
<?xml version="1.0" encoding="utf-8"?>
<soap:Envelope xmlns:soap="http://www.w3.org/2003/05/soap-envelope"
xmlns:wsa="http://schemas.xmlsoap.org/ws/2004/08/addressing"
xmlns:rpd="http://schemas.ricoh-abc.com/print">
<soap:Header>

ABBREVIATION

</soap:Header>

<soap:Body>

NON-SELECTABLE COMBINATION DATA
(MAY INCLUDE REWRITABLE PORTION)
<rpd:FeatureConstraint Feature="HolePunchUnit" Option="2and3holes" >
  <rpd:Constraints>
    <rpd:Constraint Feature="HolePunch" Option="Left4"/>
    <rpd:Constraint Feature="HolePunch" Option="Top4"/>
    <rpd:Constraint Feature="HolePunch" Option="Right4"/>
  </rpd:Constraints>
</rpd:FeatureConstraint>

#SNIP

</soap:Body>
</soap:Envelope>
```

COMMUNICATION DEVICE DRIVEN BY AN ON-DEMAND DRIVER INSTALLED IN AN APPARATUS, METHOD OF CONTROLLING THE SAME, AND SYSTEM INCLUDING THE SAME

CROSS-REFERENCE TO RELATED APPLICATIONS

The present application claims priority to and incorporates by reference the entire contents of Japanese Patent Application No. 2009-042932 filed in Japan on Feb. 25, 2009.

BACKGROUND OF THE INVENTION

1. Field of the Invention

The present invention relates to a communication device such as a computer peripheral device having a communication function, a method of controlling the communication device, and a system including the communication device.

2. Description of the Related Art

A typical example of a computer peripheral device is a printer that is driven by a printer driver. Usually, for every printer model or every operating system (OS) version, a separate printer driver is provided. Thus, development of printer drivers compatible to a large number of printer models/OS versions requires a substantial amount of effort. Moreover, due to the rise in the number of printer drivers bundled to an OS, there has been an increase in the required capacity for bundling and an increase in the time and effort of managing requests from printer driver developers to OS developers. Even from the user perspective, since it is necessary to perform the task of installing or uninstalling printer drivers for every different printer, user-friendliness gets affected at the time of using a printer.

Japanese Patent Application Laid-open No. 2008-165654 discloses a technology in which a common gateway interface (CGI) program run by a browser function of a multifunction peripheral (MFP) determines the version of a printer driver, and when a device driver needs to be updated, sends response information including driver update information that is necessary for updating the device driver to a personal computer (PC). On a remote user interface (UI) on a client PC, the user of that client PC is notified that it is necessary to obtain the latest printer driver with the information of the source destination of the latest printer driver.

However, although the technology disclosed in Japanese Patent Application Laid-open No. 2008-165654 enhances the user-friendliness to a certain extent, while updating a printer driver, the user still needs to obtain the necessary driver and then install it. Hence, it remains the case that a printer driver is installed for each printer model/OS version.

In view of the abovementioned problem, the inventors of the present invention invented a technology with the aim of reducing the number of bundled drivers to an OS and making it possible to update a device driver while freeing the user from performing the conventional task of obtaining the device driver. In the invention, an external apparatus, such as a PC, that includes a device driver for driving a computer peripheral device, such as a printer, obtains device information of the computer peripheral device (information on a function of the device) and updates the device driver by automatically producing the device driver based on the device information. The device driver produced in this way is hereinafter referred to as an on-demand driver and the description thereof is given later. Conventionally, the device information (for example, a generic printer description (GDP) file) of a computer peripheral device is stored in a device driver itself. Hence, each time a computer peripheral device is changed, it is necessary to obtain and install a device driver for the device.

In the abovementioned invention, if the device configuration changes when an optional function is newly added to the computer peripheral device or if there is a difference in settings in each usage environment, then it is sometimes necessary to rewrite (update) the device information. Besides, since it is not possible to include in the device information regarding functions that do not currently exist information in advance, it becomes necessary to update the device information sometime in the future.

SUMMARY OF THE INVENTION

It is an object of the present invention to at least partially solve the problems in the conventional technology.

According to one aspect of the present invention, there is provided a communication device that is driven by an on-demand driver installed in an apparatus that includes an on-demand driver generating program that generates the on-demand driver for the communication device based on device information of the communication device. The communication device includes: a memory unit that stores therein the device information of the communication device; a responding unit that, in response to a request for obtaining the device information from the on-demand driver generating program, sends the device information stored in the memory unit to the apparatus; and an updating unit that is used in externally updating the device information stored in the memory unit.

Furthermore, according to another aspect of the present invention, there is provide a method of controlling a communication device that is driven by an on-demand driver installed in an apparatus that includes an on-demand driver generating program that generates the on-demand driver for the communication device based on device information of the communication device. The method includes: storing the device information of the communication device in a memory unit; responding including, in response to a request for obtaining the device information from the on-demand driver generating program, sending the device information stored in the memory unit to the apparatus; and updating externally updating the device information stored in the memory unit.

Furthermore, according to still another aspect of the present invention, there is provided a system including a communication device and an information processing apparatus that is connected to the communication device via a network. The information processing apparatus includes an on-demand driver generating program that obtains device information of the communication device and, generates an on-demand driver for driving the communication device based on the device information, and the on-demand driver. The communication device includes a memory unit that stores therein the device information of the communication device, a responding unit that, in response to a request for obtaining the device information from the on-demand driver generating program, sends the device information stored in the memory unit to the information processing apparatus, and an input-output unit that is used in externally updating the device information stored in the memory unit.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 10 is a sequence diagram of operations at the time of writing device information from an external PC into the image forming apparatus according to the present embodiment;

FIG. 11 is a flowchart for explaining a sequence of operations at the time of writing device information from an external PC into the image forming apparatus according to the present embodiment;

FIG. 12 is a schematic diagram of an example of device information (fixed data);

FIG. 13 is a schematic diagram of an example of device information (variable data and maximum optional configuration);

FIG. 14 is a schematic diagram of an example of device information (non-selectable combination data);

DETAILED DESCRIPTION OF THE PREFERRED EMBODIMENTS

Exemplary embodiments of the present invention are described in detail below with reference to the accompanying drawings. The present invention is not limited to these exemplary embodiments.

Figure 1:
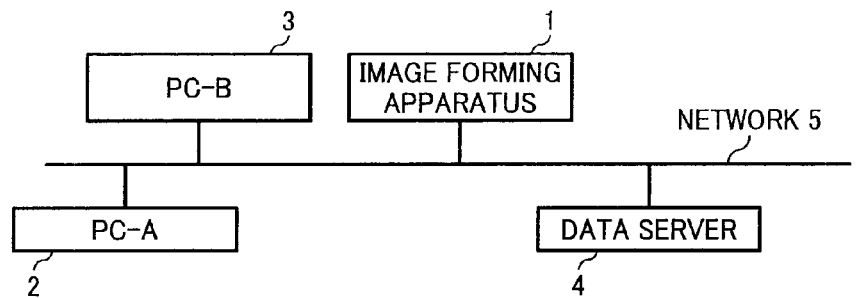
FIG. 1 is a schematic diagram of a configuration example of a system including an image forming apparatus according to an embodiment of the present invention and a plurality of information processing apparatuses connected to the image forming apparatus via a network.

Firstly, the description is given with reference to FIG. 1 about a configuration example of a system including an image forming apparatus according to an embodiment of the present invention. FIG. 1 is a schematic diagram of an exemplary system according to an embodiment of the present invention that includes an image forming apparatus and a plurality of information processing apparatus connected to the image forming apparatus via a network.

As illustrated in FIG. 1, an image forming apparatus 1, a PC-A 2 and a PC-B 3 that are information processing apparatuses, and a data server 4 are interconnected via a network 5. The data server 4 stores therein device information (described later) of the image forming apparatus 1. A typical example of the image forming apparatus 1 is a printer or an MFP. Meanwhile, the configuration illustrated in FIG. 1 is only an example and it is possible to dispose an arbitrary number of PCs or image forming apparatuses.

Figure 2:
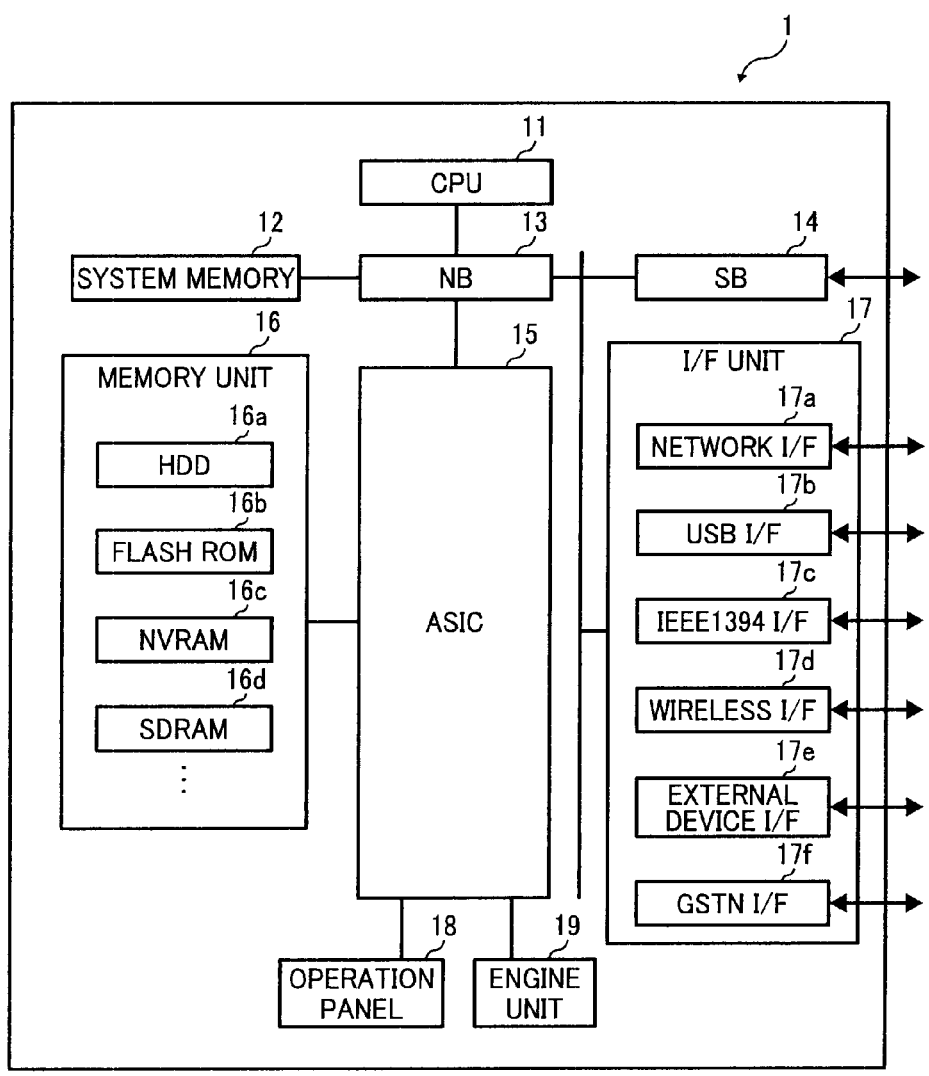
FIG. 2 is a block diagram of an exemplary configuration of the image forming apparatus according to the present embodiment.

Given below is the description with reference to FIG. 2 of a configuration of the image forming apparatus 1 according to the present embodiment. FIG. 2 is a block diagram of an exemplary configuration of the image forming apparatus 1 according to the present embodiment.

The image forming apparatus 1 includes a central processing unit (CPU) 11, a system memory 12, a north bridge (NB) 13, a south bridge (SB) 14, an application specific integrated circuit (ASIC) 15, a memory unit 16, an interface (I/F) unit 17, an operation panel 18, an engine unit 19, and other optional devices (not illustrated).

The CPU 11 intensively controls the image forming apparatus 1. The system memory 12 is configured from a read only memory (ROM) and a random access memory (RAM) and is used in storing computer programs that the CPU 11 executes. Besides, the system memory 12 is also used as a working area for performing a drawing process.

The NB 13 is a bridge that interconnects the CPU 11, the system memory 12, the SB 14, the ASIC 15, and the I/F unit 17 and that includes a memory controller or a peripheral component interconnect (PCI) master. The SB 14 is a bridge that connects the NB 13 with peripheral devices. The connection between the SB 14 and the NB 13 is established via a PCI bus.

The ASIC 15 is an integrated circuit (IC) that includes image processing hardware components and is specifically configured to perform image processing. Moreover, the ASIC 15 is connected to the operation panel 18 that is used in displaying information and receiving user input and connected to the engine unit 19 that performs image formation. The ASIC 15 performs data communication with the operation panel 18 and the engine unit 19.

The memory unit 16 includes a hard disk drive (HDD) 16a, a flash ROM 16b, a non-volatile RAM (NVRAM) 16c, and a synchronous dynamic RAM (SDRAM) 16d. The memory unit 16 is used, for example, as a storage area for storing image data or as a working area for performing image processing.

The I/F unit 17 includes a network I/F 17a such as an Ethernet (registered trademark) I/F; I/Fs such as a universal serial bus (USB) I/F 17b, an IEEE 1394 I/F 17c, and a wireless I/F 17d that are used for connection with external devices; an external device I/F 17e that enables detachable attachment of an external memory medium and that is configured compatible to the standard of the external memory medium; and a general switched telephone network (GSTN) I/F 17f that is used for connection with a public telephone network. Using these I/Fs, the image forming apparatus 1 can be connected to networks such as the Internet, an intranet, and a public telephone network or connected to a variety of external devices and apparatuses. Meanwhile, as the abovementioned external memory medium, any type of memory card such as a secure digital (SD) card or a compact flash (registered trademark) memory card can be used.

Figure 3:
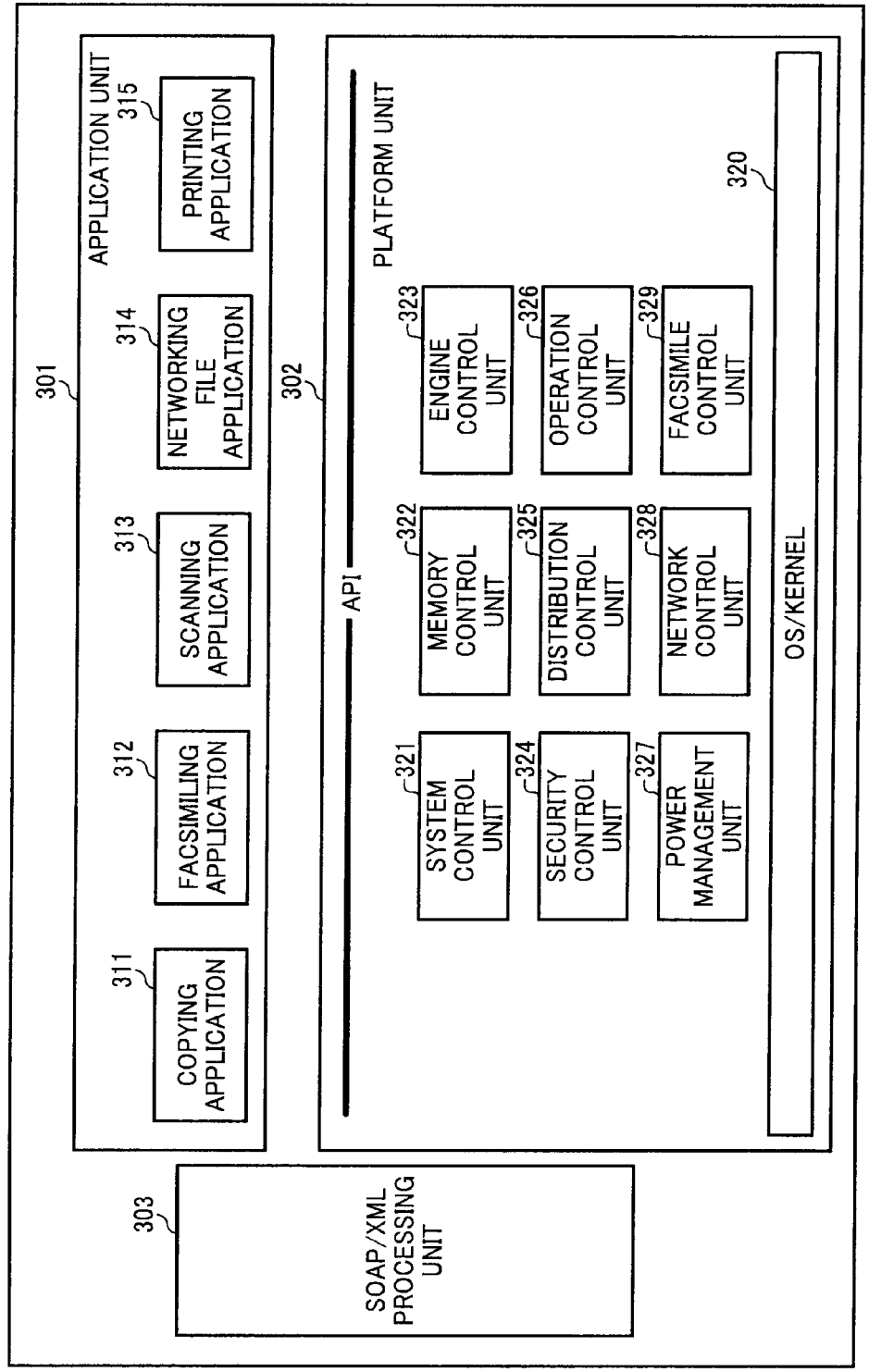
FIG. 3 is a block diagram of an exemplary software configuration of the image forming apparatus to the present embodiment.

Given below is the description with reference to FIG. 3 of a software configuration of the image forming apparatus 1 according to the present embodiment. FIG. 3 is a block diagram of an exemplary software configuration of the image forming apparatus 1.

The exemplary configuration illustrated in FIG. 3 is mainly divided into an application unit 301 and a platform unit 302. Besides, a simple-object-access-protocol/extensible-markup-language (SOAP/XML) processing unit 303 is disposed to be usable by both the application unit 301 and the platform unit 302. Meanwhile, the functions of application programs (hereinafter referred to as applications), control units, and processing units included in the application unit 301, the platform unit 302, and the SOAP/XML processing unit 303 are implemented by the CPU 11 illustrated in FIG. 11.

The application unit 301 includes a plurality of applications that perform processing inherent to user services related to image forming operations such as printing and copying. As illustrated in FIG. 3, the application unit 301 includes a copying application 311 that is an application for copying, a facsimileing application 312 that is an application for facsimileing, a scanning application 313 that is an application for scanning, a networking file application 314 that is an application regarding networking files, and a printing application 315 that is an application for printing.

The platform unit 302 is configured from a variety of control units that, along with an OS/Kernel 320, interpret processing requests issued from the application unit 301 and generate acquisition requests for acquiring various resources such as hardware resources. The platform unit 302 includes a system control unit 321, a memory control unit 322, an engine control unit 323, a security control unit 324, a distribution control unit 325, an operation control unit 326, a power management unit 327, a network control unit 328, and a facsimileing control unit 329 as described later. The OS/Kernel 320 includes a processing unit (not shown) that performs network processing under sockets.

The platform unit 302 is configured to include an application programming interface (API) that can receive processing requests from the application unit 301 using pre-defined functions.

The system control unit 321 performs processing such as management of a variety of hardware resources that includes application management, input-output control with respect to peripheral devices, and detection of optional devices. The memory control unit 322 performs processing such as acquisition/release of memory resources and compression/expansion of image data.

The engine control unit 323 controls the engine unit 19 illustrated in FIG. 2 for image formation. The security control unit 324 provides a security service to the application unit 301 or each control unit. For example, the security control unit 324 performs data encryption and data decryption. The distribution control unit 325 performs control and processing of data communicated with other devices. The operation control unit 326 controls the operation panel 18 illustrated in FIG. 2 that functions as an information transmitting unit between the user and the image forming apparatus 1.

The power management unit 327 monitors the electrical condition of the CPU 11 or other hardware resources as well as performs management and monitoring of the energy saving status of the other control units or of the application unit 301. The power management unit 327 functions in close association with the OS/Kernel 320.

The network control unit 328 is connected to the network I/F 17a such as an Ethernet (registered trademark) I/F and provides sharable services to applications that require network input-output (I/O) processing. Besides, the network control unit 328 serves as an intermediary for allocating data that is received via the network using each protocol to each application and sending data from each application to the network.

The facsimileing control unit 329 performs, via the GSTN I/F 17f, facsimile communication using a public telephone network; registration and citation of a variety of facsimile data managed in a backup memory; and provision of API for printing of received facsimiles.

As described above, the SOAP/XML processing unit 303 is disposed to be usable by both the application unit 301 and the platform unit 302. The SOAP/XML processing unit 303 performs encoding/decoding of SOAP/XML messages. Although the SOAP/XML processing unit 303 is usually provided in the form of a library, it can also be provided as a process.

Meanwhile, the image forming apparatus 1 can also be configured while removing some of the applications in the application unit 301, some of the control units in the platform unit 302, or some of the interfaces in the I/F unit 17.

Figure 4:
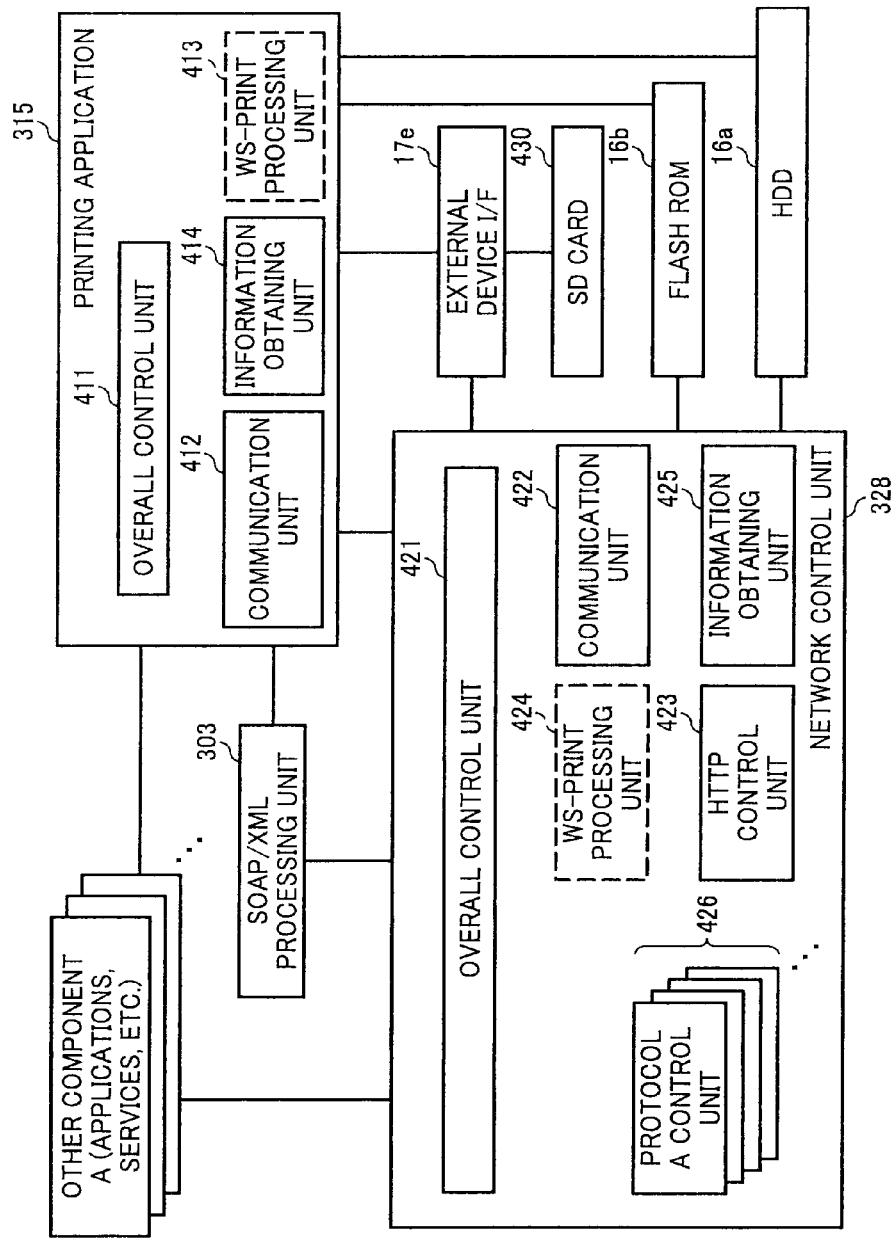
FIG. 4 is a schematic diagram of a configuration of components such as a network control unit and a printing application that are relevant to the characteristic processing of the image forming apparatus according to the present embodiment.

Given below is the description with reference to FIG. 4 about a configuration of the components such as the network control unit 328 and the printing application 315 that are relevant to the characteristic processing of the image forming apparatus 1 according to the present embodiment. In FIG. 4, a configuration example of the relevant components such as the network control unit 328 and the printing application 315 is illustrated along with other components such as applications or services as well as the SOAP/XML processing unit 303, the external device I/F 17e, and the flash ROM 16b and the HDD 16a of the memory unit 16. Meanwhile, in FIG. 4, the components also illustrated in other diagrams are referred to by the same reference numerals.

In the present embodiment, the flash ROM 16b and the HDD 16a are assumed to be non-detachable and fixed components. Moreover, although not illustrated in FIG. 4, regarding accessing the flash ROM 16b, the HDD 16a, or an external memory medium such as an SD card; the system control unit 321, the memory control unit 322, and the security control unit 324 are also involved. In the following description, the WS-PRINT protocol to which the web services on device (WSD) confirms is given as an example of the protocol for implementing the printing function.

The network control unit 328 includes an overall control unit 421 that controls the network control unit 328 in entirety; a communication unit 422 that performs communication of messages or data with other applications, control units, or the network I/F 17a; a hypertext transfer protocol (HTTP) control unit 423 that processes the HTTP protocol; a WS-PRINT processing unit 424 that processes the WS-PRINT protocol; an information obtaining unit 425 that obtains device information from external components or external devices; and a plurality of protocol control units 426 that process protocols other than the HTTP protocol (e.g., file transfer protocol (FTP), Port 9100 protocol, line printer remote (LPR) protocol, etc.).

The printing application 315 includes an overall control unit 411 that controls the printing application 315 in entirety, a communication unit 412 that performs communication of messages or data with other applications or control units, a WS-PRINT processing unit 413 that processes the WS-PRINT protocol, and an information obtaining unit 414 that obtains device information from external components.

The WS-PRINT processing units 413 and 424 are disposed in either one of the network control unit 328 and the printing application 315 and are enclosed by dashed lines in FIG. 4. In the examples of operation sequence described later, it is assumed that the WS-PRINT processing unit 424 is disposed in the network control unit 328. Meanwhile, as illustrated in FIG. 4, an SD card 430 is connected to the external device I/F 17e. Alternatively, any other similar external memory medium can also be connected.

(First Example of Operation Sequence in Response to Device Information Obtaining Request from PC)

Figure 5:
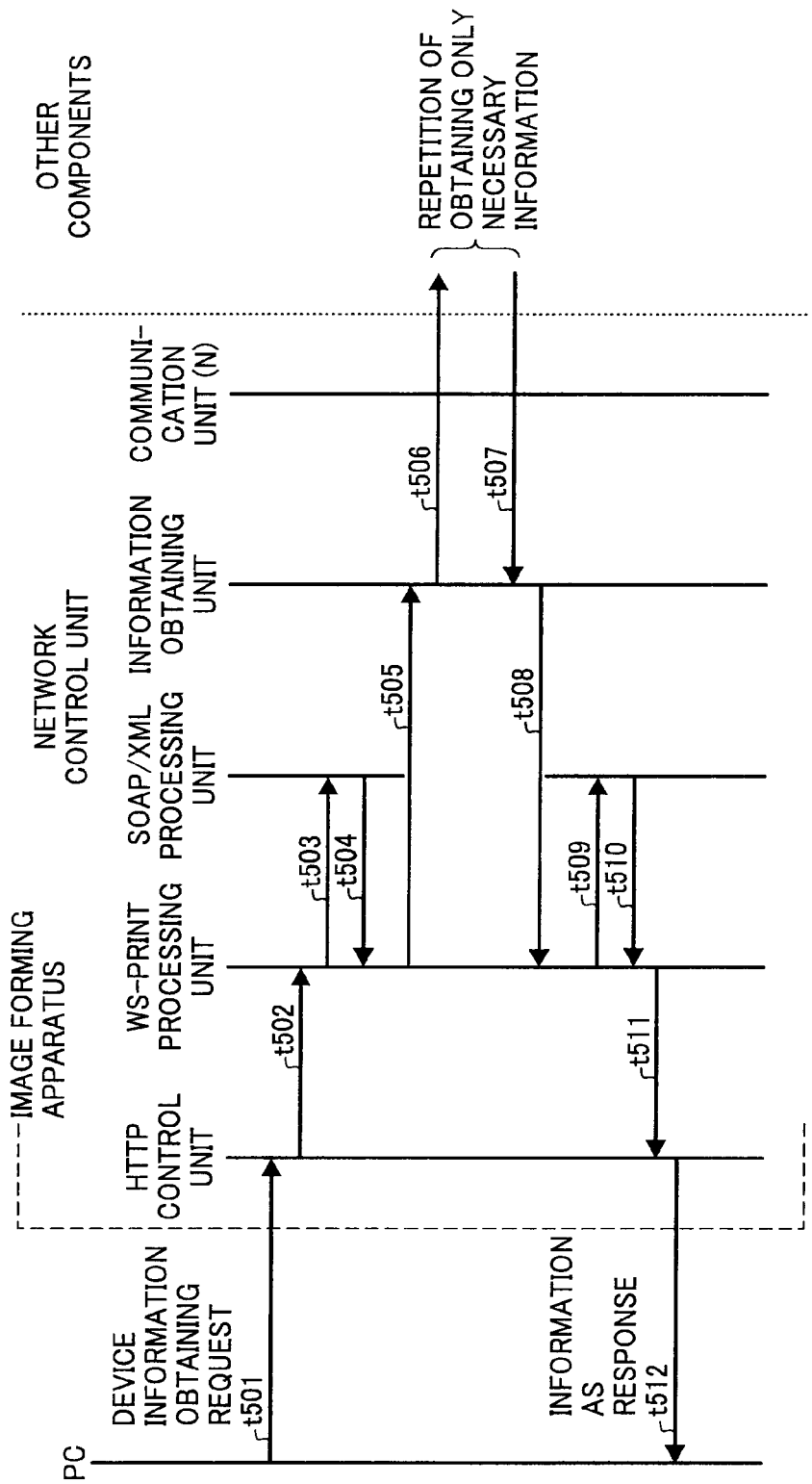
FIG. 5 is a sequence diagram of a first example of the operation sequence when a PC installed with an on-demand driver generating program according to the present embodiment issues a device information obtaining request to the image forming apparatus.

FIG. 5 is a sequence diagram of a first example of the operation sequence when a PC installed with an on-demand driver generating program (described later) issues a device information obtaining request to the image forming apparatus 1. In particular, the first example is given for a case when the network control unit 328 obtains information from other components (applications or services) in the software group illustrated in FIG. 3 or from an external memory medium or an internal memory device (flash ROM 16b or HDD 16a) via an interface. The operation sequence in the first example is as follows.

When the image forming apparatus 1 receives a device information obtaining request (t501); then, in the network control unit 328 of the image forming apparatus 1, the HTTP control unit 423 sends the device information obtaining request to the WS-PRINT processing unit 424 (t502). Subsequently, the WS-PRINT processing unit 424 sends the device information obtaining request to the SOAP/XML processing unit 303 (t503) and instructs decoding of the contents of the request. The SOAP/XML processing unit 303 decodes the contents of the device information obtaining request and sends back the decoding result to the WS-PRINT processing unit 424 (t504).

Subsequently, the WS-PRINT processing unit 424 sends the received decoding result to the information obtaining unit 425 (t505). Then, depending on the decoding result, the information obtaining unit 425 obtains necessary information as the device information from the other components via the communication unit 422 (t506, t507) and sends the device information to the WS-PRINT processing unit 424 (t508).

The WS-PRINT processing unit 424 then sends the device information received from the information obtaining unit 425 to the SOAP/XML processing unit 303 (t509) and instructs encoding of the device information. The SOAP/XML processing unit 303 encodes the device information and sends back the encoding result to the WS-PRINT processing unit 424 (t510). The WS-PRINT processing unit 424 then sends the encoded device information (specific example described later) encoded by the SOAP/XML processing unit 303 to the HTTP control unit 423 (t511). Eventually, the HTTP control unit 423 sends the received information to the PC as a response to the device information obtaining request (t512).

(Second Example of Operation Sequence in Response to Device Information Obtaining Request from PC)

Figure 6:
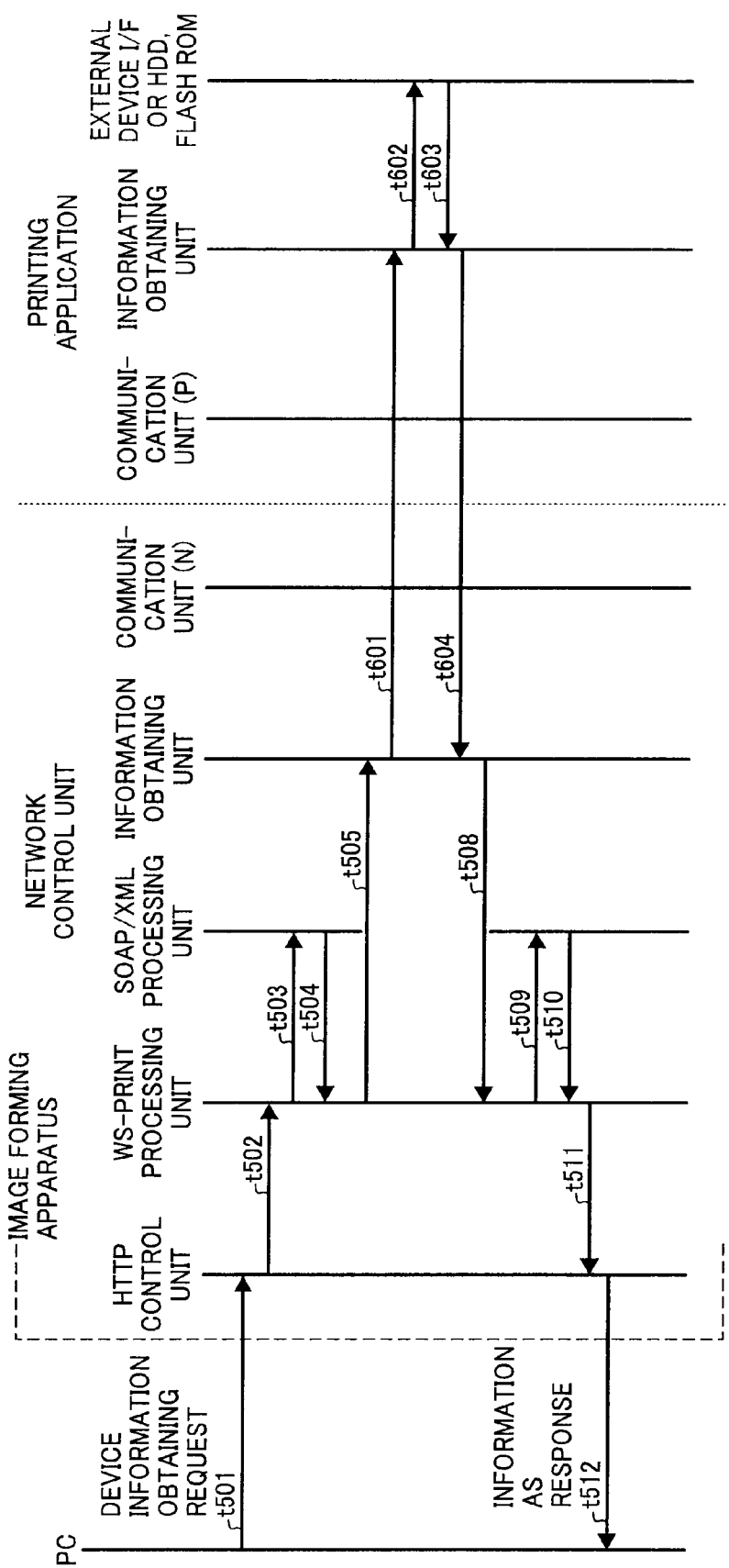
FIG. 6 is a sequence diagram of a second example of the operation sequence when a PC installed with the on-demand driver generating program according to the present embodiment issues a device information obtaining request to the image forming apparatus.

FIG. 6 is a sequence diagram of a second example of the operation sequence when a PC installed with an on-demand driver generating program (described later) issues a device information obtaining request to the image forming apparatus 1. In particular, the second example is given for a case when the printing application 315 obtains information from an external memory medium connected to the external device I/F 17e or from the flash ROM 16b or the HDD 16a.

The difference between the operation sequence in the first example and the second example is as follows. In the operation sequence in the first example, the information obtaining unit 425 in the network control unit 328 directly obtains the device information from the other components of the image forming apparatus 1 via the communication unit 422. In contrast, in the operation sequence in the second example, the information obtaining unit 425 in the network control unit 328 makes the information obtaining unit 414 in the printing application 315 obtain the device information via the communication unit 422 in the network control unit 328 and the communication unit 412 in the printing application 315 (t601 to t604). That is because of the fact that, essentially, the network control unit 328 should not be dependent on the configuration of a printer driver. Thus, by performing control of the printer driver from within the printing application 315 that has a strong association with the printer driver; it becomes possible to retain the independence of each control unit.

In the operation sequence in the second example, the information obtaining unit 414 in the printing application 315 obtains the device information from an external memory medium connected to the external device I/F 17e or from the HDD 16a or the flash ROM 16b in the memory unit 16. The device information obtained by the information obtaining unit 414 in the printing application 315 is sent to the information obtaining unit 425 of the network control unit 328 via the communication unit 412 in the printing application 315 and the communication unit 422 in the network control unit 328. The other steps (t501 to t505, t508 to t512) are identical to those in the first example (details given above). After the set of steps is implemented, the information obtaining unit 425 in the network control unit 328 sends the device information to the PC.

The abovementioned examples are given for the case when the WS-PRINT processing unit 424 is disposed in the network control unit 328. Alternatively, it is also possible that the printing application 315 including the WS-PRINT processing unit 413 makes a call to the SOAP/XML processing unit 303. In that case, the HTTP control unit 423 in the network control unit 328 sends the device information obtaining request from the PC to the WS-PRINT processing unit 413 in the printing application 315 via the communication unit 422 in the network control unit 328 and the communication unit 412 in the printing application 315. The device information is then sent to the SOAP/XML processing unit 303 for decoding. Depending on the decoding result, the information obtaining unit 414 in the printing application 315 obtains the device information.

(Third Example of Operation Sequence in Response to Device Information Obtaining Request from PC)

Figure 7:
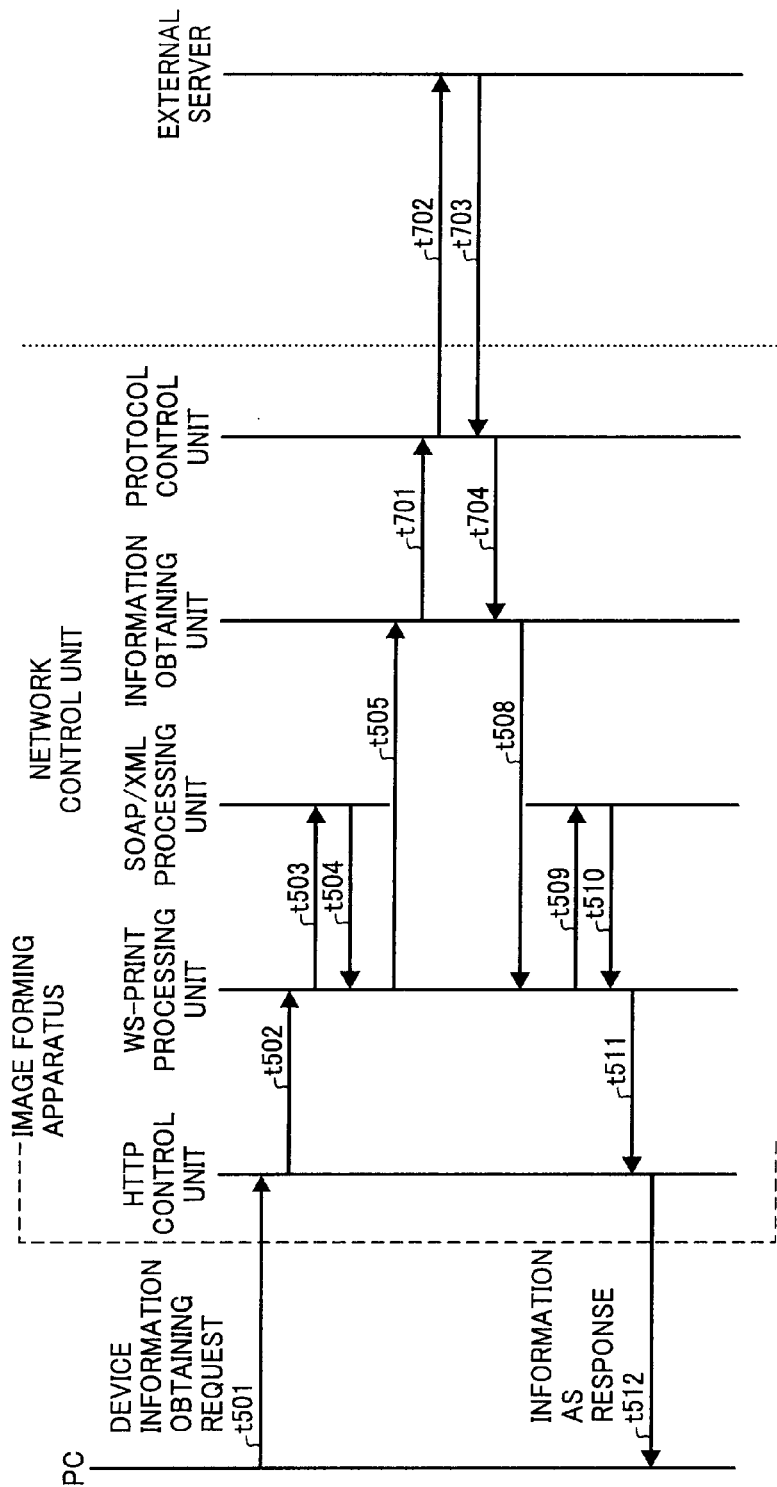
FIG. 7 is a sequence diagram of a third example of the operation sequence when a PC installed with the on-demand driver generating program according to the present embodiment issues a device information obtaining request to the image forming apparatus.

FIG. 7 is a sequence diagram of a third example of the operation sequence when a PC installed with an on-demand driver generating program (described later) issues a device information obtaining request to the image forming apparatus 1. In particular, the third example is given for a case when the network control unit 328 obtains device information that is stored in an external server.

The difference between the operation sequence in the first example and the third example is as follows. In the operation sequence in the first example, the information obtaining unit 425 in the network control unit 328 directly obtains the device information from the other components of the image forming apparatus 1 via the communication unit 422 in the network control unit 328. In contrast, in the operation sequence in the third example, the information obtaining unit 425 in the network control unit 328 obtains device information from an external server such as the data server 4 via the protocol control units 426 (t701 to t704). Because of that, the device information corresponding to the upgraded image forming apparatus 1 can be provided in an identical manner to the conventional way of releasing an updated printer driver. As a result, it becomes easier to manage when, for example, an on-demand driver is provided along with a normal driver.

In the operation sequence in the third example, depending on the decoding result of a device information obtaining request received from the WS-PRINT processing unit 424, the information obtaining unit 425 in the network control unit 328 issues an information obtaining request to the protocol control units 426 for obtaining the device information from an external server (t701). Then, the protocol control units 426 perform protocol processing on the information obtaining request, which is issued by the information obtaining unit 425, on the basis of the communication protocol (e.g., Ethernet (registered trademark)) used in the network and sends the information obtaining request to the external server via the network I/F 17a (t702).

The external server then sends back the device information as a response to the information obtaining request (t703). The protocol control units 426 perform protocol processing on the received device information based on the communication protocol used in the network and send the device information to the information obtaining unit 425 in the network control unit 328 (t704). The other steps (t501 to t505, t508 to t512) are identical to those in the first example (details given above). After the set of steps is implemented, the information obtaining unit 425 in the network control unit 328 sends the device information to the PC.

In the abovementioned examples of the operation sequence, in response to a device information obtaining request; either the network control unit 328 directly obtains the device information from other components of the image forming apparatus 1, or the printing application 315 obtains the device information via the external device I/F 17e or from the HDD 16a, or the network control unit 328 obtains the device information from an external server. Besides, the device information can also be obtained by arbitrarily combining the operation sequences in the abovementioned examples. The device information obtained by the information obtaining unit 414 or the information obtaining unit 425 is stored, dispersedly or collectively, in a memory unit of the image forming apparatus 1 such as one of the memories or the HDD 16a or in a memory unit of an external server in a predetermined format. Meanwhile, as illustrated later, the device information sent as a response to the PC has an XML format that is suitable for network communication.

(Process Flowchart in Response to Device Information Obtaining Request Issued by PC)

Figure 8:
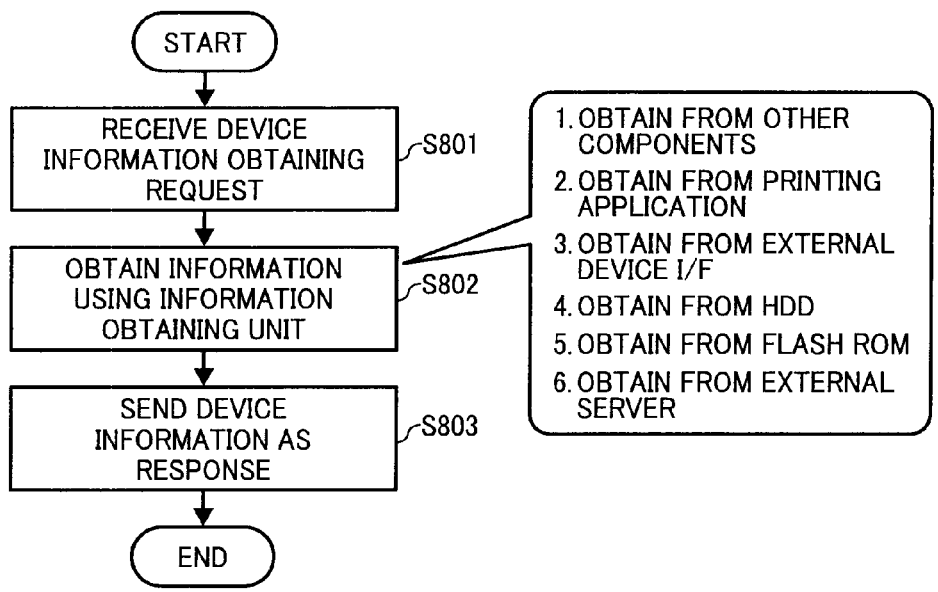
FIG. 8 is a flowchart for explaining the operations of the network control unit in the image forming apparatus according to the present embodiment in response to a device information obtaining request from a PC.

In the following description regarding the network control unit 328, the operations of the network control unit 328, which are explained in the first to third examples of the operation sequence and performed in response to a device information obtaining request from the PC, are explained with reference to a flowchart in FIG. 8. FIG. 8 is a flowchart for explaining the operations of the network control unit 328 in response to a device information obtaining request from the PC.

When the network control unit 328 receives a device information obtaining request from the PC (Step S801), the information obtaining unit 425 in the network control unit 328 responds to the device information obtaining request by obtaining the device information (Step S802).

The methods of obtaining the device information at Step S802 are as follows. As explained in the first example of the operation sequence, the information obtaining unit 425 in the network control unit 328 can obtain the device information from another component in the software group illustrated in FIG. 3, the flash ROM 16b, the HDD 16a, or an external memory medium such as the SD card 430 via the external device I/F 17e. Alternatively, as explained in the second example of the operation sequence, the network control unit 328 make the information obtaining unit 414 in the printing application 315 obtain the device information and then receive the same. Still alternatively, as explained in the third example of the operation sequence, the network control unit 328 can obtain the device information from an external server.

Eventually, the information obtaining unit 425 in the network control unit 328 sends the obtained device information to the PC as a response to the device information obtaining request (Step S803).

(Sequence of Operations at the Time of Replacedly Attaching an External Recording Medium Having Device Information Stored Therein; First Example of Device Information Updating)

Given below is the description with reference to FIG. 9 about an exemplary sequence of operations in an external information processing apparatus and the image forming apparatus 1 at the time of replacedly attaching an external recording medium having the device information stored therein.

Figure 9:
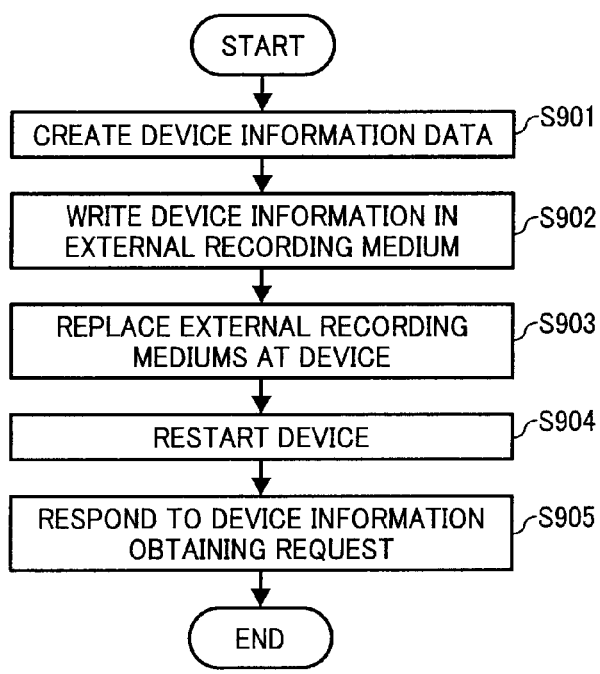
FIG. 9 is a flowchart for explaining an exemplary sequence of operations in an external information processing apparatus and the image forming apparatus according to the present embodiment at the time of replacedly attaching an external recording medium having device information stored therein.

As illustrated in FIG. 9, device information data is created in an external information processing apparatus such as a PC (Step S901). Then, the device information data is written in an external recording medium such as an SD card from the information processing apparatus (Step S902).

Subsequently, an external recording medium attached to the image forming apparatus 1 is replaced with the external recording medium in which the newly created device information data is stored (Step S903) and the image forming apparatus 1 is restarted (Step S904). After the image forming apparatus 1 restarts, the device information therein gets updated.

Then, upon receiving a device information obtaining request from the PC, the image forming apparatus 1 responds with the updated device information that has been stored in the replacedly attached external recording medium in the manner explained in the first example of the operation sequence (Step S905). In this way, an external recording medium can be used to update the device information data. For that, the newly created device information can be stored in the external recording medium from an external image processing apparatus and the external recording medium can be attached in place of the old external recording medium.

(Sequence of Operations in Response to a Device Information Writing Request from PC; Second Example of Device Information Updating)

Given below is the description with reference to FIGS. 10 and 11 about the operations in the network control unit 328 in response to a device information writing request from a PC.

FIG. 10 is a sequence diagram of operations at the time of writing the device information from an external PC into the image forming apparatus 1. FIG. 11 is a flowchart for explaining the sequence of operations at the time of writing the device information from an external PC into the image forming apparatus 1.

When the image forming apparatus 1 receives a device information writing request from an external PC (t1001, Step S1101), one of the protocol control units 426 (or the HTTP control unit 423) in the network control unit 328 performs protocol processing on the device information writing request on the basis of the communication protocol used in the network and then, via the communication unit 422 in the network control unit 328, writes the device information writing request in an external recording medium connected to the external device I/F 17e or in the HDD 16a or the flash ROM 16b of the memory unit 16 (t1002 and t1003, Step S1102). Then, a predetermined response to the device information writing request is sent back to the external apparatus (t1104, Step S1103).

In this way, as a method of updating device information data, the device information can be written from an external information processing apparatus such as a PC in an external recording medium that is detachably attached to the image forming apparatus 1 or in the HDD 16a or the flash ROM 16b that is fixedly disposed in the image forming apparatus 1.

Described below are some examples of the device information. FIG. 12 is a schematic diagram of an example of device information (fixed data) that the image forming apparatus 1 sends as a response to a device information obtaining request from outside. Meanwhile, since the device information obtained in the image forming apparatus 1 is assumedly responded via a network, the following examples of device information are illustrated in the XML format. In the examples, the description following a hash sign (#) is an explanatory comment.

In the "Body" section following the "Header" section in FIG. 12, the portion written between a <rpd:Existing Information> tag and a </rpd:Existing Information> tag represents fixed data that cannot be rewritten from outside. In that particular portion, description is given about the resolution (Resolution), a paper feeding tray (PaperFeedUnit), and a finishing unit (FinisherUnit). Regarding the resolution, it is made possible to select between 300 dots per inch (dpi) and 600 dpi. Regarding the type of the paper feeding unit (PaperFeedUnit), it is given that an A-type is attachable. Regarding the type of the finishing unit (FinisherUnit), it is given that a B-type is attachable. Such information is the fixed information regarding the capability/configuration of the image forming apparatus 1. Based on the fixed information, the on-demand driver in the PC displays a selection screen on the UI of the PC so that selections can be made regarding the fixed information.

In FIG. 13 is illustrated an example of device information (variable data and maximum optional configuration) that the image forming apparatus 1 sends as a response to a device information obtaining request from outside. In the "Body" section following the "Header" section in FIG. 13, the portion written between a <rpd:InstallableOption> tag and a </rpd:InstallableOption> tag represents variable data that can be rewritten from outside. Besides, "AllowedValue" represents the optional configuration of the image forming apparatus 1. The configuration illustrated in FIG. 13 is the maximum optional configuration. In FIG. 13, the first example of "InstallableOptionFeature" describes about a paper feed tray (PaperFeedingUnit) and it is given that either one of an A-type to a C-type of the paper feeding unit is attachable. The subsequent example describes about a finishing unit (FinisherUnit) and it is given that either one of an A-type to a C-type of the finishing unit is attachable.

At the time of generating an on-demand driver, the on-demand driver generating program installed in the PC configures the on-demand driver using the fixed data and the variable data (maximum optional configuration). That is, the on-demand driver generating program refers to the fixed data indicating the capability of the image forming apparatus 1 and the variable data indicating the maximum optional configuration of the image forming apparatus 1 and accordingly generates the on-demand driver in such a way that, even if the configuration of the image forming apparatus 1 changes, only the selection screen on the UI of the device driver is made compatible to the changed configuration without having to regenerate the core of the on-demand driver. The on-demand driver is then installed in the PC (details described later) so that the PC can control the image forming apparatus 1 using the on-demand driver.

In FIG. 14 is illustrated an example of device information (non-selectable combination data) that the image forming apparatus 1 sends as a response. In the "Body" section following the "Header" section in FIG. 14, the portion regarding "ConstraintFeature" written between a <rpd:FeatureConstraint> tag and a </rpd:FeatureConstraint> tag represents data of a non-selectable (exclusive) combination of device information. At times, that data is rewritable from outside. In the example illustrated in FIG. 14, selection of "2and3holes" as "HolePunchUnit" indicates that it is not possible to select "Left4", "Top4", and "Right4" as "HolePunchUnit". This information is reflected in the selection screen on the UI of the on-demand driver installed in the PC.

In the examples illustrated in FIGS. 12 to 14, "Existing Information", "InstallableOption", and "FeatureConstraint" are represented as separate data (XML formats). However, it is also possible to create data (XML format) by integrating the same.

Moreover, the rewritable data that changes according to the option installation status of the image forming apparatus 1 can be rewritten from outside as described above as well as rewritten dynamically. In the case rewriting the data dynamically, the option installation status of the image forming apparatus 1 is detected when the power is ON and, based on the detection result, the dynamically rewritable data is generated and stored in the SDRAM 16d or the HDD 16a. Meanwhile, the fixed data is stored in the flash ROM 16b, the HDD 16a, or the SD card 430.

(On-Demand Driver Generating Program)

Figure 15:
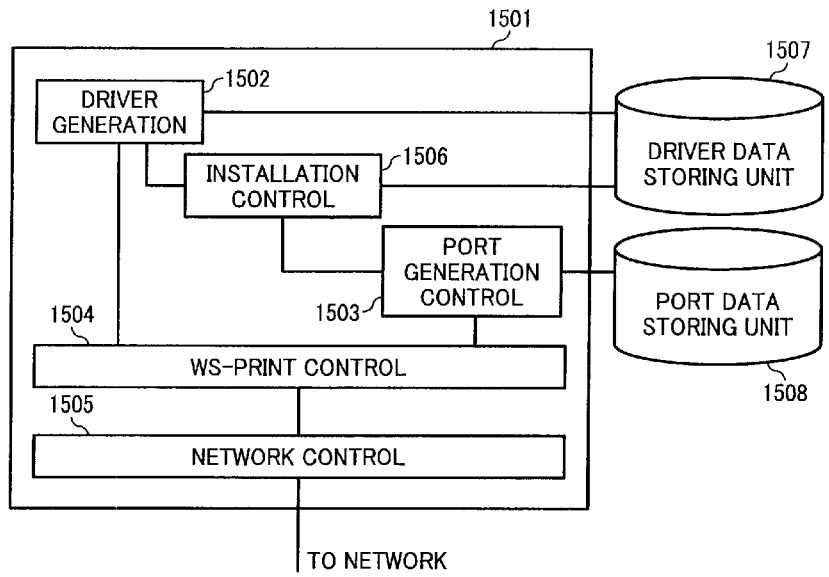
FIG. 15 is a schematic diagram of a configuration of the on-demand driver generating program installed in a PC.

Given below is the description with reference to FIG. 15 about the on-demand driver generating program that is installed in the PC and that generates an on-demand driver for the image forming apparatus 1 on the basis of the device information of the image forming apparatus 1. FIG. 15 is a schematic diagram of a configuration of the on-demand driver generating program installed in the PC.

An on-demand driver generating program 1501 includes a driver generating module 1502 that obtains the device information from the image forming apparatus 1 and generates an on-demand driver; a port generating module 1503 that generates a port (line printer daemon (LPD) port, LPR port, component object model (COM) port, WSD port, etc.) used by the on-demand driver; a WS-PRINT control module 1504 that processes the WS-PRINT protocol; a network control module 1505 that controls packets communicated with an external network; and an installation control module 1506 that installs in the PC an updated on-demand driver having a UI.

At the time of generating the on-demand driver, the driver generating module 1502 obtains the device information of the image forming apparatus 1 over the network via the WS-PRINT control module 1504 and the network control module 1505 (using a WSD port). The on-demand driver generated by the driver generating module 1502 and the port data generated by the port generating module 1503 are respectively stored in a device-driver data storing unit 1507 and a port data storing unit 1508 inside an HDD in the PC.

The driver generating module 1502 is a computer program that uses the device information and generates an on-demand driver having a UI specific to the device information. Generally, a device driver for an image forming apparatus has two functions, namely, a function for processing target information for printing received from an application and converting that information into a printing instruction and a graphic user interface (GUI) function for displaying a printing setting screen to the user so that the user can set printing conditions for the application and the image forming apparatus. The on-demand driver generating program generates a new on-demand driver by changing (adding/deleting) GUI components to reflect therein the contents of the obtained device information and then making only the UI compatible to the updated device information. That is, the on-demand driver generating program rebuilds only the UI of the on-demand driver based on the updated device information. Consequently, the image forming apparatus 1 gets upgraded and, even when the device information is newly updated, the on-demand driver can be uninstalled once and then reinstalled using the same on-demand driver generating program. Likewise, the single on-demand driver generating program can be used in installing the on-demand driver for a plurality of models.

According to a request issued by an application, the on-demand driver generated in the abovementioned manner displays on the UI thereof the selectable items based on the obtained device information. Then, the on-demand driver performs print control of the image forming apparatus 1 by sending thereto a printer job language (PJL) file or a postscript (PS) file that includes a job ticket of printing conditions (paper size or option settings) selected/set by the user on the UI. Thus, as long as the on-demand driver generating program and a single on-demand driver are installed in the PC, the PC can deal with any model of an image forming apparatus that is driven by the on-demand driver or deal with an image forming apparatus that has undergone changes in the optional configuration or settings. As a result, the user is freed from the task of obtaining a new device driver. Besides, the user can confirm the current functions of the image forming apparatus and make use of those functions.

Moreover, as described above, regarding settings (duplex printing, stapling, etc.) that have no direct effect with respect to an image portion of the page description language (PDL); the printer driver can operate just by comprehending the UI display format or the non-selectable combinations. However, regarding settings (reduction or aggregation) for the image portion that the printer driver is also able to process; that portion can be considered to be a fixed portion and a common UI can be created at the device driver side as necessary.

(Installation of on-Demand Driver)

Figure 16:
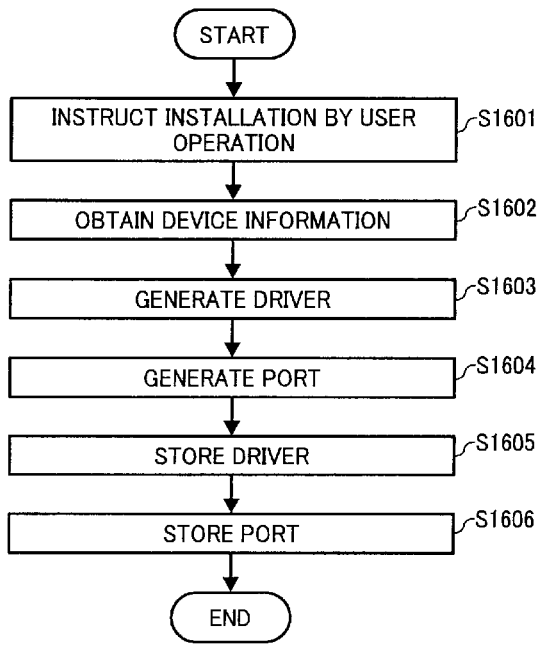
FIG. 16 is a flowchart for explaining an exemplary sequence of operations when the on-demand driver is installed in a PC by the on-demand driver generating program in that PC.

FIG. 16 is a flowchart for explaining an exemplary sequence of operations when the on-demand driver is installed in the PC by the on-demand driver generating program. Given below is the description with reference to FIG. 16 about the operations when the on-demand driver is installed by the on-demand driver generating program.

Firstly, when driver installation instruction is issued via a user operation (Step S1601), the installation control module 1506 instructs the driver generating module 1502 to send a device information obtaining request to the image forming apparatus 1 via the WS-PRINT control module 1504 and the network control module 1505 and obtain as a response the device information from the image forming apparatus 1 (Step S1602).

Figure 17:
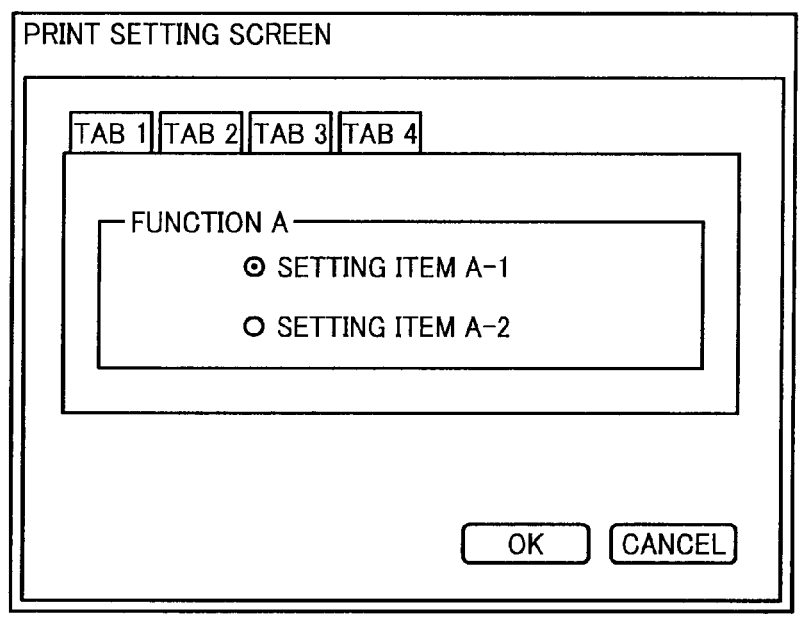
FIG. 17 is a schematic diagram of an exemplary print setting screen (before rebuilding) as the UI of an on-demand driver.
Figure 18:
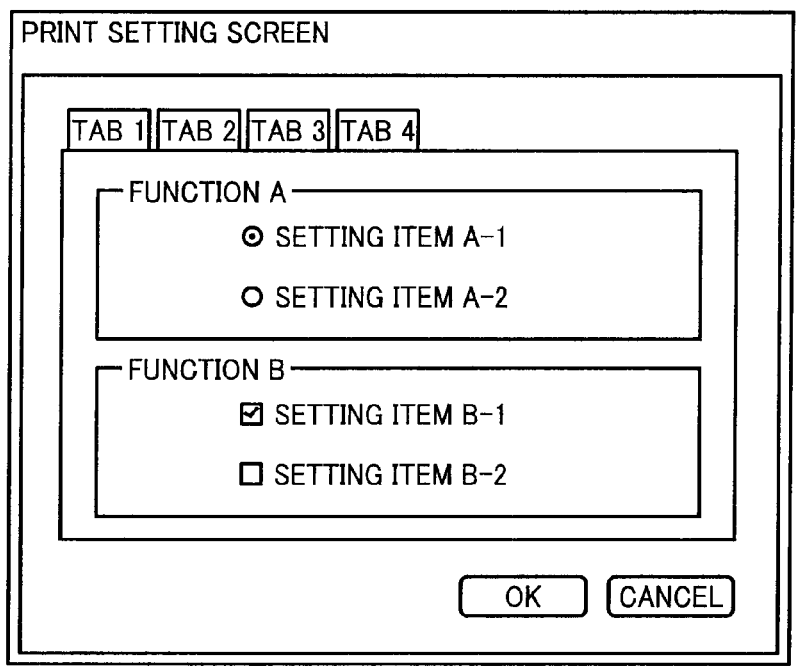
FIG. 18 is a schematic diagram of an exemplary print setting screen (after rebuilding) as the UI of the on-demand driver.

Upon obtaining the device information of the image forming apparatus 1, the driver generating module 1502 generates the on-demand driver based on the device information (Step S1603). That is, the driver generating module 1502 rebuilds the UI to reflect therein the obtained device information and generates the on-demand driver having the rebuilt and customized UI. FIG. 17 is a schematic diagram of an exemplary print setting screen before rebuilding the UI and FIG. 18 is a schematic diagram of an exemplary print setting screen after rebuilding the UI. Upon rebuilding the UI (herein, a function B is added to the image forming apparatus as an example), the print setting screen illustrated in FIG. 17 changes to the print setting screen illustrated in FIG. 18 in which selection/setting can be performed regarding the function B.

Subsequently, the installation control module 1506 instructs the port generating module 1503 to generate a port for the on-demand driver generated at Step S1603 (Step S1604).

Then, the installation control module 1506 instructs the driver generating module 1502 to store the on-demand driver generated at Step S1603 in the device-driver data storing unit 1507 (Step S1605).

Subsequently, the installation control module 1506 instructs the port generating module 1503 to store the data of the port generated at Step S1604 in the port data storing unit 1508 (Step S1606).

In this way, the on-demand driver customized at the time of installation and the corresponding port data are installed in the PC. When the PC is booted, a loader (not illustrated) loads the installed on-demand driver in the system memory 12 that is the main memory of the PC. The port data is used in connection with the on-demand driver.

In the example illustrated in FIG. 16, the installation processing is performed with the driver installation instruction issued via a user operation as the starting point. Alternatively, for example, it is also possible to store the previously obtained device information in the PC; newly obtain the device information of the image forming apparatus 1 upon booting the PC; and, if comparison of the newly obtained device information and the stored device information indicates an update, then perform the processing starting from Step S1603. After the installation is complete, the PC can be rebooted and the updated on-demand driver and the port data can be reloaded so that the updated on-demand driver can be used without needing the user operation for the purpose of driver updating.

Meanwhile, the operation sequences, the data, or the processing flows in the abovementioned description are given only as examples. Alternatively, for example, it can also be the case that the components of the network control unit 328 and the printing application 315 belong to other different components or that the destination for obtaining information is wide-ranging irrespective of whether the destination is inside or outside of the communication device. Moreover, in the various operation sequences described above, it can be the case that the information is encrypted using the secure sockets layer (SSL) or the transport layer security (TLS) or that the data itself is separately encrypted.

Meanwhile, the image forming apparatus 1 according to the embodiment of the present invention is assumed to be an image forming apparatus (MFP) having copying, facsimileing, scanning, and printing functions. However, the present invention is also implementable to an image forming apparatus such as a single-function copying machine having communication capability, a single-function printer, a single-function scanning device, and a single-function facsimileing device, or implementable to a computer peripheral device. Besides, the present invention is not limited to an image forming apparatus or a computer peripheral device, but is also implementable to any communication device that is driven by a device driver installed in an external apparatus.

The image forming apparatus 1 described above in detail enables achieving the following advantages. Since the device information, which the image forming apparatus 1 functioning as a communication device sends in response to a device information obtaining request from the on-demand driver generating program, is rewritable or updatable from outside of the image forming apparatus 1; the device information used by the on-demand driver can be controlled/managed for each user (administrator) rather than controlling/managing it for each communication device. That makes it easier to provide the device information necessary for each model so that the functions of the device driver can be controlled with respect to the environment in which the models are installed and not with respect to the models. For example, it becomes possible to keep control over the optional configuration or manage conditions such as restricting a particular device (or the department in which that device is installed) from using colors. That enables achieving reduction in the overall management cost.

Moreover, because of the configuration of storing the device information in a component that is physically detachable from the image forming apparatus 1 and attaching that component to the image forming apparatus 1, it becomes possible to provide the device information using an external recording medium such as an SD card. Thus, even in an environment having restrictions on network access or in a non-network-compliant environment, the device information can be controlled/managed without difficulty.

Furthermore, because of the configuration of storing the device information in a physically non-detachable component (fixedly disposed Flash ROM or HDD); it can be made sure that the device information is not changed by anybody other than the administrator.

Moreover, by enabling rewriting of the device information via the network to which the image forming apparatus 1 is connected, it becomes possible to update the device information without having to be present at the location of the image forming apparatus 1.

Furthermore, since the device information, which the image forming apparatus 1 sends in response to a device information obtaining request from the on-demand driver generating program in a PC, is stored in an external apparatus; the device information of a plurality of devices can be managed without difficulty in the external apparatus such as a data server.

Moreover, by configuring the device information to include a rewritable portion and a fixed portion, it becomes possible to reduce the updatable volume of device information.

Furthermore, by configuring the device information to include information regarding the maximum optional configuration that is connectable to the image forming apparatus 1, it becomes possible to eliminate the need for making changes to the on-demand driver even when the optional configuration connected to the image forming apparatus 1 is changed later.

Moreover, because of the configuration of detecting the optional configuration connected to the image forming apparatus 1 and dynamically generating the device information based on the optional configuration, the device information gets automatically updated.

Furthermore, by configuring the device information to include the non-selectable combination of device information, the device driver updated with the device information enables the user to perform correct function selections.

Meanwhile, it is assumed that each computer program (software) executed in the image forming apparatus 1 of the present embodiment is stored in a ROM or an HDD in advance. Alternatively, the computer programs can be provided in the form of installable or executable files on a computer-readable storage device such as a compact disk read only memory (CD-ROM), a flexible disk (FD), a compact disk recordable (CD-R), a digital versatile disk (DVD), or a memory card such as an SD card.

Still alternatively, the computer programs can be stored in a computer connected over a network such as the Internet and can be downloaded via the network for distribution.

The computer programs executed in the image forming apparatus 1 according to the present embodiment contain modules for each of the abovementioned components (the application unit 301, the platform unit 302, and the SOAP/XML processing unit 303). In practice, the CPU 11 (processor) retrieves each computer program from the ROM or the HDD 16*a* and runs it such that each program is loaded in the system memory. As a result, the modules for the application unit 301, the platform unit 302, and the SOAP/XML processing unit 303 are generated in the system memory.

According to an aspect of the present invention, a communication device driven by an on-demand driver can be easily provided with device information that is used at the time of generating the on-demand driver for each model and/or usage environment and it is possible to update the device information. Moreover, since the device information can also be rewritten depending on the usage environment, the functions of the on-demand driver can be controlled with respect to the environment in which the models are installed and not with respect to the models. Besides, since the user is freed from the task of obtaining the device driver, there is an enhancement in the user-friendliness while using the communication device.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A communication device that is driven by an on-demand driver installed in an apparatus that includes an on-demand driver generating program that generates the on-demand driver for the communication device based on device information of the communication device, the communication device comprising:
 a memory that stores therein the device information of the communication device, the device information including information on functions of the communication device and including fixed non-updatable data and updatable data that is updatable from outside the communication device;
 a web service (WS) processing unit that receives a request for obtaining the device information from the on-demand driver generating program, sends the request and an instruction to decode content of the request to a processing unit, sends the decoded content received from the processing unit to an information obtaining unit, and receives the device information obtained by the information obtaining unit based on the decoded content, the WS processing unit being configured to process a WS-print protocol, which is a protocol for implementing a printing function of the communication device;

a responding unit that receives the device information from the WS processing unit and sends the device information to the apparatus, in response to the request for obtaining the device information from the on-demand driver generating program, the request being sent in response to the apparatus being booted, the apparatus comparing the device information, including the information on the functions of the communication device, the fixed non-updatable data, and the updatable data, with previously obtained device information stored at the apparatus to determine whether an update is needed, the on-demand driver being generated in response to a determination that the update is needed, the apparatus being rebooted after the on-demand driver is generated and the on-demand driver being loaded in the apparatus after the apparatus has been rebooted; and an updating unit that is used in externally updating the device information stored in the memory.

2. The communication device according to claim 1, wherein the device information is partially or entirely stored in a memory medium that can be mounted on the communication device in a removable manner, and the device information can be updated by mounting the memory medium on the communication device.

3. The communication device according to claim 1, wherein the device information is partially or entirely stored in a memory medium that is mounted on the communication device in a fixed manner.

4. The communication device according to claim 1, wherein the updating unit is connectable to a network and updates the device information with information from outside via the network.

5. The communication device according to claim 1, wherein the information obtaining unit obtains the device information that is to be sent in response to the request by the on-demand driver generating program from an external device.

6. The communication device according to claim 1, wherein the device information includes information regarding a maximum optional configuration that is connectable to the communication device.

7. The communication device according to claim 1, further comprising a detecting unit that detects an optional configuration connected to the communication device, wherein the device information is dynamically generated based on the optional configuration detected by the detecting unit.

8. The communication device according to claim 1, wherein the device information includes information regarding a combination of pieces of device information that cannot be selected from among items to be selected on a user interface of the on-demand driver for the communication device based on the device information.

9. The communication device according to claim 1, wherein the communication device is an image forming apparatus having a communication function.

10. The communication device according to claim 1, wherein the device information, including the information on the functions of the communication device, the fixed non-updatable data, and the updatable data, is partially or entirely stored in an SD card that is configured to be mounted on the communication device in a removable manner, and the device information being updated by mounting the SD card on the communication device.

11. A method of controlling a communication device that is driven by an on-demand driver installed in an apparatus that includes an on-demand driver generating program that generates the on-demand driver for the communication device based on device information of the communication device, the method comprising:

storing the device information of the communication device in a memory, the device information including information on functions of the communication device and including fixed non-updatable data and updatable data that is updatable from outside the communication device;

receiving, by a web service (WS) processing unit, a request for obtaining the device information from the on-demand driver generating program, sending the request and an instruction to decode content of the request to a processing unit, sending the decoded content received from the processing unit to an information obtaining unit, and receiving the device information obtained by the information obtaining unit based on the decoded content, the WS processing unit being configured to process a WS-print protocol, which is a protocol for implementing a printing function of the communication device;

responding including receiving the device information from the WS processing unit and sending the device information to the apparatus, in response to the request for obtaining the device information from the on-demand driver generating program, the request being sent in response to the apparatus being booted, the apparatus comparing the device information, including the information on the functions of the communication device, the fixed non-updatable data, and the updatable data, with previously obtained device information stored at the apparatus to determine whether an update is needed, the on-demand driver being generated in response to a determination that the update is needed, the apparatus being rebooted after the on-demand driver is generated and the on-demand driver being loaded in the apparatus after the apparatus has been rebooted; and updating externally updating the device information stored in the memory.

12. The communication device control method according to claim 11, further comprising:

detecting an optional configuration connected to the communication device; and generating the device information dynamically based on the optional configuration detected at the detecting.

13. A system comprising:

a communication device; and an information processing apparatus that is connected to the communication device via a network, wherein the information processing apparatus includes an on-demand driver generating program that obtains device information of the communication device, which includes information on functions of the communication device and includes fixed non-updatable data and updatable data that is updatable from outside the communication device, in response to the information processing apparatus being booted, compares the device information, including the information on the functions of the communication device, the fixed non-updatable data, and the updatable data, with previously obtained device information that is stored in a memory of the information processing apparatus to determine whether an update is needed, and generates, in response to a determination that the update is needed, an on-demand driver for driving the communication device based on the device information, the information processing apparatus being rebooted after the on-demand driver is generated and the on-demand driver being loaded in the information processing apparatus after the information processing apparatus has been rebooted, and the on-demand driver, and the communication device includes
- a memory that stores therein the device information of the communication device, the device information including the information on the functions of the communication device, the fixed non-updatable data, and the updatable data that is updatable from outside the communication device,
- a web service (WS) processing unit that receives a request for obtaining the device information from the on-demand driver generating program, sends the request and an instruction to decode content of the request to a processing unit, sends the decoded content received from the processing unit to an information obtaining unit, and receives the device information obtained by the information obtaining unit based on the decoded content, the WS processing unit being configured to process a WS-print protocol, which is a protocol for implementing a printing function of the communication device,
- a responding unit that receives the device information from the WS processing unit and sends the device information to the information processing apparatus, in response to the request for obtaining the device information from the on-demand driver generating program, the request being sent in response to the information processing apparatus being booted, and
- an input-output unit that is used in externally updating the device information stored in the memory.

14. An apparatus comprising:
a memory configured to store previously obtained device information obtained from a communication device that includes a web service (WS) processing unit; and
an on-demand driver generating program configured to
- send a request for obtaining device information to the WS processing unit, in response to the apparatus being booted, the WS processing unit receiving the request, sending the request and an instruction to decode content of the request to a processing unit, sending the decoded content received from the processing unit to an information obtaining unit, and receiving the device information obtained by the information obtaining unit based on the decoded content, the WS processing unit being configured to process a WS-print protocol, which is a protocol for implementing a printing function of the communication device,
- obtain the device information from the communication device in response to the apparatus being booted, the device information including information on functions of the communication device and including fixed non-updatable data and updatable data that is updatable from outside the communication device,
- compare the device information, including the information on the functions of the communication device, the fixed non-updatable data, and the updatable data, with the previously obtained device information to determine whether an update is needed, and
- generate, in response to a determination that the update is needed, an on-demand driver for driving the communication device based on the device information, the apparatus being rebooted after the on-demand driver is generated and the on-demand driver being loaded in the apparatus after the apparatus has been rebooted.

15. The apparatus according to claim 14, wherein
the on-demand driver generating program is configured to generate a port for the on-demand driver after the on-demand driver is generated, the apparatus being rebooted after the on-demand driver and the port are generated.

* * * * *